United States Patent [19]

Christine

[11] Patent Number: 4,607,764
[45] Date of Patent: Aug. 26, 1986

[54] FLUENT PRODUCT EXTRACTION SYSTEM
[75] Inventor: William C. Christine, Catasauqua, Pa.
[73] Assignee: Trinity Foundation, Nazareth, Pa.
[21] Appl. No.: 666,756
[22] Filed: Oct. 31, 1984
[51] Int. Cl.⁴ .................. B65D 25/42; B65D 37/00
[52] U.S. Cl. ............................ 222/207; 222/213; 222/491; 222/571
[58] Field of Search .......... 222/207, 214, 185, 490, 222/494, 571, 212, 213, 215, 491

[56] References Cited

U.S. PATENT DOCUMENTS

| | | | |
|---|---|---|---|
| 4,256,242 | 3/1981 | Christine | 222/207 |
| 4,261,484 | 4/1981 | DaCosta et al. | 222/571 X |
| 4,334,640 | 6/1982 | van Overbruggen et al. | 222/214 X |

FOREIGN PATENT DOCUMENTS

| | | | |
|---|---|---|---|
| 2227728 | 11/1974 | France | 222/571 |
| 659403 | 10/1951 | United Kingdom | 222/519 |

Primary Examiner—H. Grant Skaggs
Assistant Examiner—Nils Pedersen
Attorney, Agent, or Firm—Sherman Levy

[57] ABSTRACT

An apparatus for intermittently and accurately discharging a measured portion of the contents of a container by a peristaltic pumping action and such apparatus includes an elongated elastomeric tubular body having a connection at one end for attachment to the container and a discharge tip section at the other end on which a dispensing valve and cap are mounted.

3 Claims, 6 Drawing Figures

U.S. Patent     Aug. 26, 1986     4,607,764
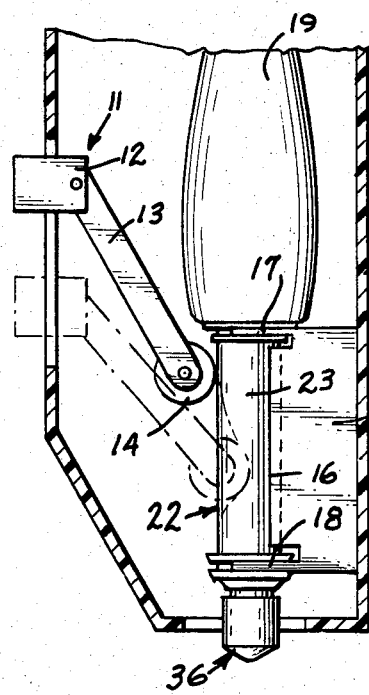
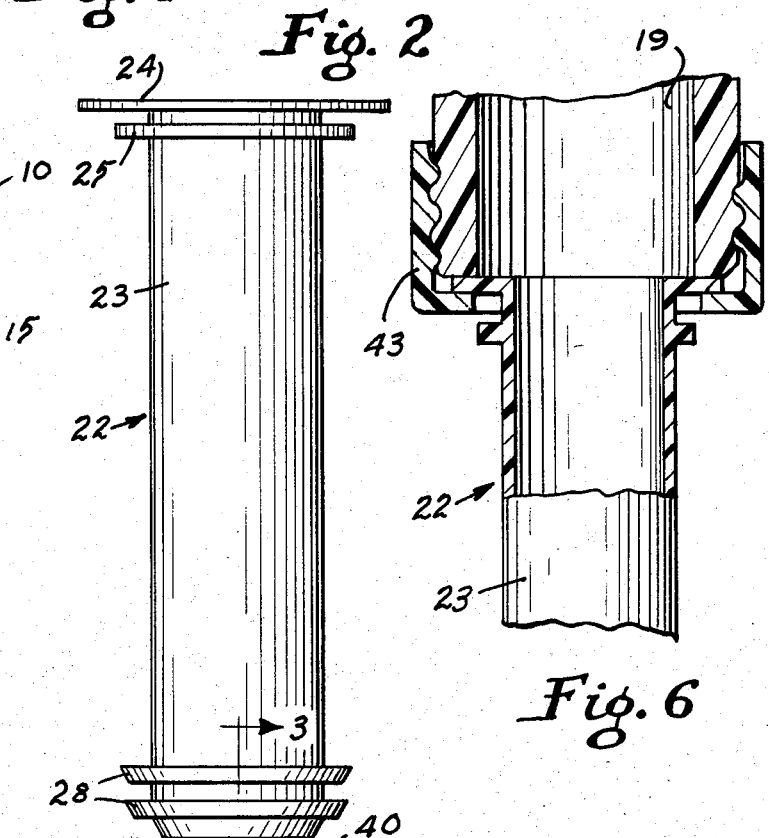
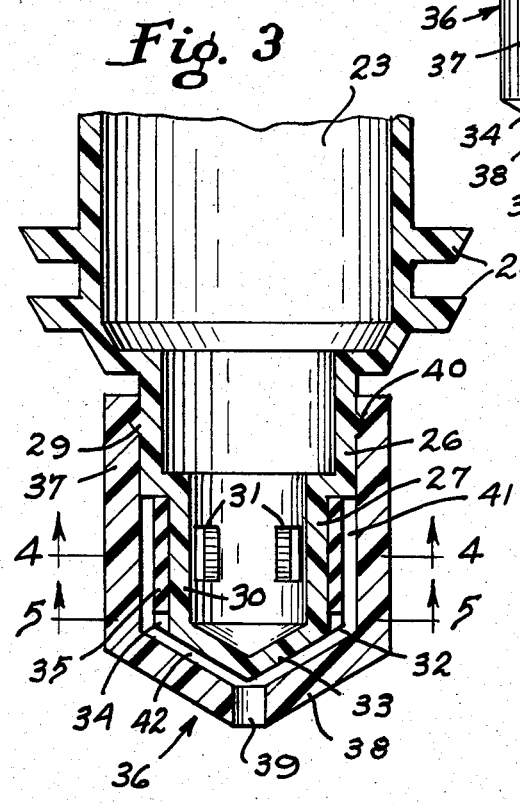
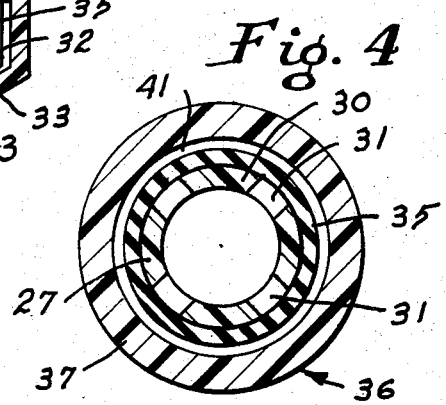
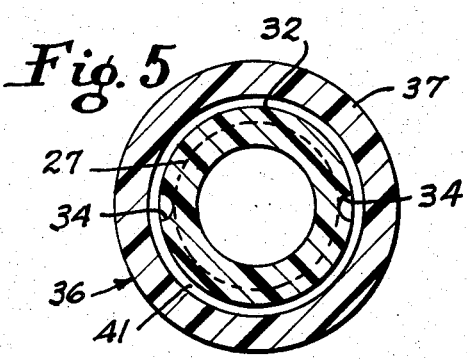

FLUENT PRODUCT EXTRACTION SYSTEM

BACKGROUND OF THE INVENTION

This invention relates generally to the field of dispensing materials and relates particularly to the dispensing of fluent materials of a liquid, powdery, or granular nature.

FIELD OF THE INVENTION

Heretofore, metered peristaltic pumping of small accurate quantities of fluent material from containers such as collapsible plastic bags, plastic bottles, and metal containers was accomplished with elaborate means requiring a number of parts including connectors on the container, fittings to connect suitable elastomeric tubing for use in the peristaltic pressuring discharge of the material, means for directing the flow path of the material, and a separate valving means to prevent after-drip. This has been complex, costly, and required elaborate assembly procedures.

DISCLOSURE OF PRIOR ART

Heretofore effects have been made to try to overcome the inherent problems mentioned above, and exemplary of the U.S. prior patents are the following:
U.S. Pat. No. 2,554,570: L. M. Harvey
U.S. Pat. No. 3,066,832: C. Rossetti
U.S. Pat. No. 3,081,911: W. R. Scholle
U.S. Pat. No. 4,130,224: Norman, et al
U.S. Pat. No. 4,256,242: W. C. Christine
U.S. Pat. No. 4,349,133: W. C. Christine However, none of these prior patents or any others known to applicant anticipates the present invention.

SUMMARY OF THE INVENTION

An object of the present invention is to provide a fluent product extraction system which includes a dispensing tube (fitment) that is molded of elastomeric plastic material which is characterized by its simplicity and which is especially suitable for automatic attachment.

Another object of the present invention is to provide a fluent product extraction system which permits the cost of the service unit to be reduced by automatically assembling the dispensing tube to the pouch.

A still further object of the present invention is to provide a fluent product extraction system which includes a low cost simple device that provides a method and means for intermittently and accurately discharging the contents of a collapsible package of a fluent product, and wherein the fluent product extraction system lends itself to many different products in the food, chemical, and pharmaceutical industies where controlled, airless extraction from the flexible (collapsible) containers are used.

A still further object of the present invention is to provide a low cost, simple device for intermittently and accurately discharging the contents of a container by peristaltic pumping or squeezing action and which lends itself to automatic assembly procedures, the device including an elastomeric tubular body having a connector at one end for attachment to a container of fluent material and an integral discharge tip section at the other end which receives a dispensing valve and a cap or nozzle so that a conventional peristaltic pumping member may be used to dispense accurate quantities of material without after-drip.

Other objects and advantages of the present invention will become apparent in the following specification when considered in the light of the attached drawings.

BRIEF DESCRIPTION OF THE DRAWINGS

FIG. 1 is a side elevational view illustrating one application of the invention.

FIG. 2 is a side elevational view of the invention, per se, with portions broken away for clarity.

FIG. 3 is an enlarged sectional view taken along the line 3—3 of FIG. 2.

FIG. 4 is a sectional view taken along the line 4—4 of FIG. 3.

FIG. 5 is a sectional view taken along the line 5—5 of FIG. 3.

FIG. 6 is a fragmentary sectional view of a modified form of connection.

DESCRIPTION OF PREFERRED EMBODIMENT

With continued reference to the drawing, a housing 10 is provided having a conventional peristaltic pump 11 which includes an operating member 12 pivotally connected to an arm 13, A roller 14 or other squeezing member is mounted on the end of the arm 13. An anvil or mounting block 15 is fixed to the inside of the housing 10 on the side opposite the peristaltic pump and such anvil includes an elongated shallow channel 16 with outwardly extending bifurcated fingers 17 and 18 at opposite ends thereof. A collapsible, semi-rigid or substantially rigid container 19 is mounted within the housing and contains a supply of fluent material in liquid, powerdy, or granular form. The structure thus far described is conventional and forms no part of the invention.

With particular reference to FIGS. 1-5, a dispensing member 22 is provided including an elongated tubular body 23 having a sealing flange 24 at one end so that the member 22 may be attached to the container 19 by means of heat, adhesives, or the like. The body 23 is aligned with an opening (not shown) in the container to permit the fluent material within the container to flow into the body 23. A mounting flange 25 is integrally formed on the body 23 in spaced relationship with the sealing flange 24 to receive the upper finger 17 of the mounting block between the same and prevent vertical movement of the container 19. At the end remote from the sealing flange 24, the body 23 is integrally formed with an axial intermediate portion 26 of reduced diameter which, in turn, is integrally connected to a tip portion 27 of further reduced diameter. The lower portion of the main body, preferably, is provided with a pair of integrally formed spaced flanges 28 which receive the lower finger 18 of the mounting block 15 and prevent any elongation of the body 23 during the pumping operation.

The intermediate portion 26 has an outwardly extending annular rib 29, for a purpose to be described later. The tip portion 27 has a generally cylindrical side wall 30 through which a plurality of openings 31 extend. The lower end of the tip portion 27 has an outwardly extending flange 32 and terminates in a conical end wall 33. The flange 32 is provided with a pair of detents or indents 34 on opposite sides of the tip portion which function as flow channels when material is being dispensed.

The body 23 is constructed of a polymeric material which is sealable to a polymeric container, is of sufficient stiffness and dimensional stability to permit automatic feeding during assembly, is of sufficient flexibility to permit the pumping action of a conventional peristaltic pump and has sufficient resilience and memory to return to its original shape when the pumping pressure is relieved.

In order to close the openings 31 and normally prevent continuous flow of the fluent material, an elastomeric band 35 of predetermined hardness and elasticity is disposed about the side walls of the tip portion 27 between the intermediate portion 26 and the flange 32 as illustrated best in FIG. 3. The band functions as a valve and closes the openings 31 until a predetermined pressure on the fluent material caused by the peristaltic pump 11 overcomes the elasticity of the band and moves the band outwardly to permit the material to flow through the openings 31 and through the detents 34 in the flange 32 of the tip portions 27.

A cap 36 is provided having a generally cylindrical side wall 37 and a conical end wall 38 which is disposed at substantially the same angle as the end wall 33 of the tip portion. An axial opening 39 is provided in the end wall 38 to permit fluent material to discharge from the cap. The inner periphery of the side wall 37 is of a size to form a slide fit with the exterior of the tip portion 27 and such inner periphery has a locking groove 40 which receives the rib 29 of the tip portion to retain the cap on the tip portion. The space 41 between the inner periphery of the side wall 37 of the cap and the outer surface of the valve forming elastomeric band 35 is controlled so as to permit expansion of the elastomeric band under pressure but not enough space that the band may be axially displaced past the flange 32. This space normally is less than the thickness of the band.

Additionally, the space 42 between the outer surface of the conical end wall 33 of the tip portion and the inner surface of the conical end wall 38 of the cap is controlled to provide a space that is dependent upon the viscosity of the fluent material being dispensed. For example, a space to accommodate 1,000 centipoise material is approximately 0.015 inch. Controlling the space 41 permits the establishment of a miniscus of material between the conical end wall surfaces so that no dripping of the fluent material occurs after the pumping pressure is relieved. A small amount of fluent material remains in place to seal the space 42 from any ingress of air. It is noted that the number and sizes of the openings 32 in the tip portion 27 may be varied in accordance with the viscosity and flowability of the fluent material. Further, the diameter and length of the tubular body 23 as well as the stroke of the peristaltic pump may be changed to provide more or less capacity.

With particular reference to FIG. 6, it is contemplated that in cases when the container 19 has a threaded discharge spout, a complimentary threaded cap 43 may be attached by heat or adhesives to the end of the tubular body 23. In this event, the sealing flange 24 and the mounting flange 25 may be omitted.

In the operation of the device, the fluent material normally is located within the body 23, however, the low head pressure of such material is not sufficient to overcome the elasticity of the band 35 and, accordingly, no discharge and no drip occurs. When a discharge of material is desired, the peristaltic pump 11 is operated so that the roller 14 or other squeezing member engages and applies a pressure to the material within the body as the roller moves toward the tip portion 27 of the body. When the pressure created by the perstaltic pump reaches a predetermined value, the elastomeric band 35 expands and permits the fluent material to flow through the openings 31 in the tip portion and the detents 34 in the flange 32 and then flow through the space 42 and be discharged through the opening 39 in the cap 36. As the pump pressure is relieved, the elasticity of the band 35 closes the openings 31. The space 42 between the conical end walls 33 and 38 will cause a pressure drop in such space and will allow the fluid therein to establish a miniscus across the opening. Hence, when the fluent material is not being urged by the pressure of the peristaltic pump, no fluent material will emerge from the cap.

The parts can be made of any suitable material and any shapes or sizes as desired or required. With further reference to the fluent product extraction system of the present invention there is provided a dispensing tube or service unit which has advantages over the prior patents such as prior U.S. Pat. Nos. 4,256,242 and 4,349,133. An important difference is that the new dispensing tube (fitment) is molded of elastomeric plastic, redesigned for simplicity and suitable for automatic attachment. It will be noted that the cost of the service unit can be reduced by automatically assembling the dispensing tube to the pouch. The dispensing tube described in U.S. Pat. No. 4,256,242 is elastomeric and does not have sufficient stiffness to be automatically fed and automatically attached, and the one in U.S. Pat. No. 4,349,133 is integral with the container.

With the present invention there is now utilized a polymeric material with the dispensing tube which when formulated has the following characteristics:

a. Sealable to the polymeric bag by heat or other means;

b. Sufficient stiffness and dimensional stability to permit automatic feeding;

c. Sufficient flexibility to permit the pumping action described in U.S. Pat. No. 4,256,242;

d. Sufficient resilience and memory to return to its original shape when released by the pump roller.

Some of the important aspects or features of the present invention are as follows. There is provided a service unit composed of a polymeric pouch with a polymeric dispensing tube attached thereto. The polymeric dispensing tube is suitable for attachment in a form/fill-/seal pouch making machine. The polymeric dispensing tube suitable for attachment to a polymeric bag wherein the tube is a pumping means and contains a check valve. The check valve body is an integral part of the polymeric tube or collapsible polymeric tube. The device consists of not more than 3 parts that includes a collapsible tube, elastomeric check valve, and cap.

Prior to the present invention metered peristaltic pumping of small accurate quantities of fluid from containers such as plastic bags, plastic bottles, and metal cans was accomplished with very elaborate means that required a number of parts including connectors on the containers, fittings to connect suitable elastomeric tubing for use in the peristaltic pressuring discharge means for directing the fluent path of the product, and a separate valving means to prevent after-drip.

Such methods were complex, costly, and required elaborate assembly procedures. An important object of the present invention is to provide a low cost, disposable pumping means for metered dispensing of fluidic products from a variety of containers such as collapsible polymeric bags or semi-rigid or rigid containers being adjustable as to quantity of product pumped and with no after-drip.

The invention comprises (1) a molded polymeric tubular body of suitable elastomeric and memory qualities with flange means for fastening to a polymeric bag or connection to a threaded boss on a rigid container by secondary means of a screw or snap cap, flanges on the tubular section to facilitate a clamping means, a body section which will elastomerically respond to peristaltic pressure from a variety of means such as rollers, squeezing blocks, and similar devices, flanges at the lower end of the body to provide a clamping means, a check valve body section with discharge orifices occurring at appropriate locations, an enlarged diameter of the check valve body with a recessed groove to provide a locking means for a dispensing tip, fluent path grooves through the check valve retainer ring located below the orifice, a check valve retainer ring (flange) and a conical end to the body which, with the tip, will provide a means of establishing a non-dripping product discharge area, (2) a molded plastic cap mounting flange section of the pump tube and a projection in this section that will interlock with the check valve body locking groove when the cap is installed, a conical section which matches the conical section of the pump tube and an orifice which will allow the product to be discharged, (3) an elastomeric band of known hardness and elasticity which will be placed over the section of the pump tube identified as the check valve body.

It is to be understood that the entire pump, when assembled, consists of (1) the pump tube, (2) an elastic band check valve, and (3) a dispensing cap. Any of a variety of peristaltic pressure means can be applied to make the pump operable and it can be connected to a variety of containers as desired or required.

Further, the diameter and length of the pump tube and the length of the tube squeezed by the peristaltic pressure means can be changed to provide more or less capacity.

Also, the orifice size of the cap and the space between the conical surfaces of the pump tube and the cap can be adjusted so that an infinite variety of fluidic products can be dispensed without dripping. Maintaining the correct distance between conical surfaces will cause a pressure drop. Creating the correct orifice size will allow the fluid with very low head pressure to establish a miniscus across the opening. Thus, when the product is not being urged by the peristaltic pressure, no product will emerge from the cap.

The fluid extraction system of the present invention is an improvement over the prior patents such as prior U.S. Pat. Nos. 4,256,242 and 4,349,133.

It will be seen that there has been provided a low cost simple device which provides a method and means for intermittently and accurately discharging the contents of a collapsible package of a fluent product. The device combines a flange capable of being joined to a collapsible package, a body section in a configuration suitable for any of a number of types of peristaltic pumping (squeezing) devices, a formed end which includes several diameters; first, a section which will retain a dispensing tip, secondly, a body with horizontal (side) discharge ports, and, thirdly, a tip section which provides one-half of a conductor for the fluent material being discharged. Two detents in the discharge end retainer flange assist in guiding the flow path of the fluent product from the section containing the discharge ports to the dispensing tip.

Further, the two remaining parts which comprise the total pump/flanged attachment/method/check valve-/and dispensing tip are: first, a flat elastomeric band of predetermined strength and, secondly, a dispensing tip.

It is to be noted that the elastomeric band functions to retain the fluent material in the package until its sealing force over the discharge ports is overcome by the pressure of the pump.

The tip slides over the check valve section to provide a control over the direction of flow of the fluent material being discharged by the pump.

It will be noted that the tip orifice size and the space between the tip and conical body section are determined as follows:

1. A controlled space is determined between the tips' inside a diameter and the outside diameter of the elastomeric band sufficient to permit expansion of the elastomeric band under pressure, but not so much space as to allow its dislocation. This space is approximately one-half the thickness of the elastomeric band.

2. The conical tip of the pump body and the conical form of the inside of the tip are spaced relative to the viscosity of the fluent product being dispensed. For example, the space for 1,000 centipoise material is approximately 0.015 inches.

3. Controlling the space between these two surfaces relative to the viscosity of the fluent product permits the establishment of miniscus of product between the two surfaces so that there is no dripping of product from the dispenser after the pump pressure is released. A small amount of the product remains in place to seal the tip area from an ingress of air and from the accidental dripping of any product after the pump shut off.

Also, this type of fluent product extraction system lends itself to many different products in the food, chemical, and pharmaceutical industries where controlled, airless extractions from flexible (collapsible) containers are used.

The present invention is a device which is adapted to be connected to a collapsible package. The device includes a flange which is the means for securing the device to the collapsible package or a more rigid package which can be vented. The elastomeric type of dispensing tube is characterized by having memory, and this is an important part of the system. The device also includes a body section which is tubular which permits the use of a peristaltic pumping device. There is provided a check valve over the apertures and a cap is arranged over the same and this accomplishes several functions. One, it draws the stream of the fluid material when it is discharged by the pumping action; secondly, there is established a relationship between the diameter of the check valve and the tip or cap on the end. Also, there is provided an exact relationship between the body part which is at the terminal end of the pump tube, and the reason for this is that depending on the viscosity of the product, the space between these parts has to be narrowed or widened in order to retain a miniscus across the field and so it does not drip after the pumping is stopped. The check valve may be in the form of a flat rubber band that can be conveniently made from a latex or any elastic material.

The other important dimension is the distance between the check valve and the inside diameter of the cap and it must be such that it can be expanded when pumping but not to the point where it can be dislodged from its position on the tip.

Thus, it will be seen that if uncontrolled expansion were permitted the band could be forced out of place and the system would cease to function, allowing the product to flow out unrestricted.

It will be seen that the present invention can be used in a variety of ways making it a very economical way of dispensing fluent products.

While I have disclosed one embodiment of the present invention it is to be understood that this embodiment is given by example only and not in a limiting sense, the scope of the present invention being determined by the objects and the claims.

What is claimed is:

1. A fluent material dispensing apparatus for use with a container having fluent material therein, and means for selectively applying pressure to the fluent material, comprising an elongated tubular body, means for connecting one end of said body to the container in a manner to receive fluent material therefrom, an intermediate portion and a tip portion integrally connected to the other end of said body, said tip portion having a side wall with at least one opening therethrough, an elastomeric band of predetermined thickness encircling said side wall of said tip portion and normally closing said opening, and a cap having side walls and a discharge opening mounted on said intermediate portion and in spaced relationship with said tip portion, whereby pressure applied to the fluent material causes the elastomeric band to expand and permit fluent material to flow from said tip portion and said cap, and wherein the space between the outer surface of said elastomeric band and the inner surface of said cap side walls is less than the thickness of said band.

2. The invention of claim 1 including said tip portion having a conical end wall, said cap having a conical end wall in spaced parallel relationship with said conical end wall of said tip portion, the space between said conical end walls permitting fluent material to flow therethrough but retaining a small amount of material therein when the pressure is relieved to establish a miniscus to prevent dripping.

3. A fluent material dispensing apparatus for use with a container having fluent material therein, and means for selectively applying pressure to the fluent material, comprising an elongated tubular body, means for connecting one end of said body to the container in a manner to receive fluent material therefrom, an intermediate portion and a tip portion integrally connected to the other end of said body, said tip portion having a side wall with at least one opening therethrough, an elastomeric band of predetermined thickness encircling said side wall of said tip portion and normally closing said opening, and a cap having side walls and a discharge opening mounted on said intermediate portion and in spaced relationship with said tip portion, whereby pressure applied to the fluent material causes the elastomeric band to expand and permit fluent material to flow from said tip portion and said cap, and wherein said tip portion has a flange to retain said elastomeric band, said flange having at least one indent to permit fluent material to flow through said flange.

* * * * *